United States Patent [19]

Neumayr et al.

[11] 3,933,774

[45] Jan. 20, 1976

[54] MODIFIED POLYMERS OF DIISOPROPENYLBENZENE

[75] Inventors: Franz Neumayr, Weisenheim; Gerhard Fahrbach, Schwetzingen; Erhard Seiler, Freiburg, all of Germany

[73] Assignee: BASF Aktiengesellschaft, Ludwigshafen, Germany

[22] Filed: Mar. 21, 1974

[21] Appl. No.: 453,375

[30] Foreign Application Priority Data
Apr. 7, 1973 Germany............................ 2317602

[52] U.S. Cl. .......... 260/88.2; 260/83.7; 260/93.5 S; 260/94.2 M; 252/431 L
[51] Int. Cl.²............. C08F 210/00; C08F 212/00; C08F 236/04; C08F 136/02
[58] Field of Search.......................... 260/88.2, 83.7

[56] References Cited
UNITED STATES PATENTS
3,652,516  3/1972  Farrar................................ 260/83.7

FOREIGN PATENTS OR APPLICATIONS
1,219,682  6/1966  Germany 1,219,682  6/1966  Germany

OTHER PUBLICATIONS

Nakajima, in "Polymer Molecular Weight Methods," Advances in Chemistry Series 125, American Chemical Society, Washington, D.C., 1973, pp. 98–107.
Forman, in "Polymer Chemistry of Synthetic Elastomers"—Part II (Interscience, 1969) pp. 491–596.
Forman, in "Polymer Chemistry of Synthetic Elastomers—Part II" (Interscience, 1969) pp. 451–596.
Morton, in "Vinyl Polymerization—Part II," (Marcel Dekker, 1969), pp. 211–229.

*Primary Examiner*—Joseph L. Schofer
*Assistant Examiner*—A. L. Clingman
*Attorney, Agent, or Firm*—Johnston, Keil, Thompson & Shurtleff

[57] ABSTRACT

Modified copolymers of vinyl aromatic compounds or diene hydrocarbons with diisopropenylbenzene. They contain at least 0.2% of polymerized units of a group of the general formula The copolymers are intermediates in the manufacture of block copolymers and graft copolymers suitable for use as impact-resistant plastics or polymeric antistatic agents.

8 Claims, No Drawings

MODIFIED POLYMERS OF DIISOPROPENYLBENZENE

This application discloses and claims subject matter described in German patent application No. P 23 17 602.5, filed Apr. 7, 1973, which is incorporated herein by reference.

This invention relates to modified copolymers of vinyl aromatic compounds or diene hydrocarbons with diisopropenylbenzene.

German Published Application No. 1,219,682 discloses copolymers of vinyl monomers with p-diisopropenylbenzene and processes for the manufacture thereof by polymerization with the aid of organolithium compounds. It is an object of the present invention to modify such copolymers in such a manner that intermediates for the manufacture of valuable block copolymers and graft copolymers are obtained.

The present invention relates to modified copolymers consisting of from 99 to 50% by weight of a vinyl aromatic compound or diene hydrocarbon and from 1 to 50% by weight of diisopropenylbenzene, preferably p-diisopropenylbenzene, which copolymers contain at least 0.2% by weight of a group of the general formula

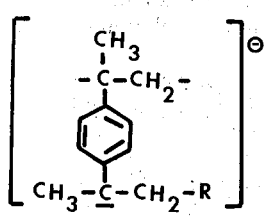

where R is alkyl, aryl or cycloalkyl of up to 36 carbon atoms.

If the starting material used is not pure p-diisopropenylbenzene but a mixture of isomers, the copolymers obtained will also contain

$$CH_3-C-CH_2-R$$

groups attached in the m-position as well as a small amount of said groups attached in the o-position.

The copolymers of vinyl aromatics or idene hydrocarbons and the diisopropenylbenzene are prepared by polymerization in organic solvents using organometallic compounds as initiators. In this process, only one of the isopropenyl groups of the diisopropenylbenzene reacts, the other isopropenyl group forming a substituent on the polymer chain. Particularly suitable vinyl aromatic compounds are styrene and derivatives thereof such as α-methylstyrene or nuclear substituted styrenes. Suitable diene hydrocarbons are butadiene and isoprene. It is possible, of course, to use a mixture of said monomers. The structure of the copolymers formed largely depends on the type of initiator, the solvent and the polymerization temperature used. Using monofunctional initiators, e.g. butyl lithium or cumyl potassium, the polymers obtained have one living chain end, whereas the use of difunctional initiators such as tetrameric α-methylstyrene dipotassium, lithium naphthalene or sodium naphthalene leads to polymers having two living chain ends. Copolymers in which the diisopropenylbenzene groups are randomly distributed are obtained either by continuously feeding the monomers to a stirred vessel, in which thorough mixing of the components is achieved, or by using nonpolar solvents such as hexane, benzene or toluene and relatively high polymerization temperatures. If polymerization is carried out at low temperatures in polar solvents such as tetrahydrofuran, anisol or dioxane, the copolymers obtained are preferentially block copolymers having gradual transitions between the blocks. Block copolymers having sudden transitions may be obtained by adding the monomers in stages, for example by first adding butadiene and then adding the diisopropylbenzene when the butadiene has been polymerized. The effect of the temperature on the structure of the copolymers may be explained as follows: At elevated temperatures, for example temperatures above 30°C and especially above the ceiling temperature of diisopropenylbenzene, which is about 60°C, the vinyl aromatic monomer or diene hydrocarbon monomer polymerize first, so that small amounts of diisopropenylbenzene units are randomly distributed in the chain, the relative number thereof increasing as the concentration of vinyl aromatic compound or diene hydrocarbon decreases. When these monomers are virtually completely consumed, no diisopropenylbenzene chain can form, since at high temperatures a bond which has been formed between two or more diisopropenylbenzene molecules immediately depolymerizes. Such depolymerization is avoided when low temperatures, preferably temperatures below 10°C, are used, and in this case a block of diisopropenylbenzene can form. When difunctional initiators are used, p-diisopropenylbenzene blocks form at each end. The molecular weight of the copolymers preferably ranges from 10,000 to 500,000.

The present modification of the copolymers is effected by reacting the unchanged second isopropenyl substituent with an organometallic compound to form polymers containing carbanions. As a rule, the same substances may be used for such metalization as are described as initiators for the manufacture of the copolymers. This reaction is also carried out in organic solvents with the exclusion of water, acids and oxygen. The temperature is preferably between −100°C and +80°C. Such modification may be carried out immediately after copolymerization and it is not necessary to stop the living chains. However, the copolymers may, if desired, be separated from the solvent and dried and then redissolved for the purpose of carrying out said modification.

The modified copolymes are polyanions. Suitable gegenions are alkali metals, particularly lithium, sodium and potassium. The modified copolymers are intermediates in the manufacture of valuable block copolymers and graft copolymers.

For example, vinyl monomers such as styrene, methyl methacrylate or butadiene may be anionically grafted to the modified copolymers, the point of attachment being at the metallized isopropenyl units in the chain. If a random copolymer is used, the products are genuine graft copolymers. If a block copolymer is used, the product is a block copolymer in which the monomers are grafted to the p-diisopropenylbenzene block. The latter graft copolymers may be used for example in the manufacture of rubber-modified vinyl polymers by solution polymerization. Ethylene oxide or propylene oxide may be grafted to the modified copolymers when the gegenion is sodium or, preferably, potassium. Such graft copolymers may be used as polymeric antistatic agents.

Another reaction which may be carried out with the modified copolymers is the reaction with polar low molecular weight compounds such as carbon dioxide, carbon disulfide, disubstituted chloroamines or ethylene oxide followed by hydrolysis. In this way, carboxyl groups or alcohol groups may be introduced into the polymer molecule, which groups are then capable of entering into further reactions.

If modification has been carried out using a deficiency of organometallic compound in relation to the amount of p-diisopropenylbenzene units in the copolymer, some double bonds will remain in the polymer molecule, at which double bonds free radical reactions, for example free radical graft polymerizations, may take place.

EXAMPLE 1 a. 2,500 ml of toluene distilled over lithium butyl are placed in a vessel and cooled to 0°C. A mixture of 325 g of butadiene and 20 g of p-diisopropenylbenzene is added. The reaction solution is heated to 50°C and initiated with 30 ml of a 1.5% lithium butyl solution in hexane. The solution has a pale yellow color indicating that mainly butadiene is being polymerized. After 3 hours at 50°C, the color changes to red, this indicating that incompletely consumed p-diisopropenylbenzene is reacting. On account of the low ceiling temperature, however, no polymerization occurs. Conversion is 98% and the molecular weight of the polymer is found to be 82,000 by viscosity measurements. In this polymer, the reactive isopropenyl groups are randomly distributed in the polymer chain. In the infra-red spectrum they are seen to be situated beside the double bonds of the polybutadiene.

$b_1$. Half of the living polymer solution is mixed at room temperature with 50 ml of 1.5% lithium butyl solution in dimethoxy ethane. The red polymer solution now becomes dark red. The modified copolymer of the invention is now formed. A small portion of the polymer solution is withdrawn and precipitated with methanol. The molecular weight has risen only slightly. The infra-red spectrum shows isopropenyl groups but the amount thereof has decreased.

$c_1$. The polymer solution ($b_1$) is cooled to $-40°C$. 130 g of methyl methacrylate, previously dried by distillation over calcium hydride, are added. The reaction proceeds with considerable evolution of heat. The temperature rises to about $-10°C$ despite cooling. After 1 hour, the reaction is stopped with methanol and precipitation is carried in excess methanol. The conversion is 100%. The composition of the product is 44% by wiehgt of methyl methacrylate, 52% by weight of butadiene and 4% by weight of p-diisopropenylbenzene. The molecular weight has risen to about 200,000. The product obtained is a graft copolymer consisting of a polybutadiene skeleton with polymethyl methacrylate side chains grafted thereto.

$b_2$. The other half of the polymer solution (a) is dried in a high vacuum and dissolved in 1,000 ml of tetrahydrofuran at room temperature. Impurities are titrated out with lithium butyl and the solution is then mixed with 50 ml of 1.5% lithium butyl in hexane. The polymer solution becomes dark red.

$c_2$. To this solution there are added 5 ml of ethylene oxide and the mixture is stirred at room temperature for 1 hour. The red color disappears after the addition of the ethylene oxide. The polymer is precipitated with methanol to which some glacial acetic acid has been added. The product obtained is a polybutadiene having $-CH_2-CH_2-OH$ groups randomly distributed along the polymer chain. In addition, reactive isopropenyl groups are still present.

EXAMPLE 2 a. 2,000 ml of tetrahydrofuran which has been distilled over $\alpha$-methylstyrene dipotassium are placed in a vessel and cooled to 0°c. 50 ml of a 1.5% lithium butyl solution in hexane are added and 325 g of butadiene are slowly added and polymerized. The butadiene polymerization is complete after a few minutes. A small portion of the solution is withdrawn and the molecular weight is determined by viscosity measurements and found to be 47,000. To the living polymer solution there are added 20 g of p-diisopropenylbenzene and the mixture is maintained at 0°C for 1 hour. Conversion is 100%. The copolymer is completely soluble, this indicating that no crosslinking has taken place. The isopropenyl groups form a block at the end of the chain.

$b_1$. Half of the polymer solution is mixed at 0°C with slightly impure tetrahydrofuran until decolorization just takes place so that the chains are completely stopped. 50 ml of 1.5% lithium butyl solution in hexane are then added and the solution immediately turns back to red.

$c_1$. The polymer solution is cooled to $-40°C$ and 130 g of methyl methacrylate are added. The temperature rises to about $-10°C$. The polymerization is stopped after 1 hour at low temperature with methanol/acetic acid, and the polymer is precipitated with methanol. Conversion is 100%. The copolymer contains 52% by weight of butadiene, 4% by weight of p-diisopropenylbenzene and 44% by weight of methyl methacrylate grafted to the chain end in a stellate arrangement. The molecular weight is about 100,000, i.e. it has approximately doubled.

$b_2$. The other half of the polymer solution is precipitated with methanol, dried, dissolved in 100 ml of toluene and heated to 60°C. 30 ml of 1.5% lithium butyl solution in hexane are added and the solution slowly turns red. It is stirred for 1 hour at 60°C.

$c_2$. Pure dry carbon dioxide is passed into this solution until the red color disappears. The polymer is precipitated with methanol to which some glacial acetic acid has been added. The polymer contains $-COOH$ groups and isopropenyl groups.

EXAMPLE 3 a. 2,000 ml of tetrahydrofuran are placed in a vessel and 325 g of butadiene together with 50 g of p-diisopropenylbenzene are added and the mixture is cooled to $-10°C$. Polymerization is initiated by the addition of 30 ml of a 1.5% solution of lithium butyl in hexane. The temperature rises to 30°C at the commencement of polymerization, the yellow color indicating the preferential butadiene polymerization, but after a few minutes the color changes to red. Stirring is continued for 1 hour at 0°C. Conversion is 100%. The molecular weight is approx. 95,000. This copolymer is a 2-block copolymer having gradual transitions. The reactive isopropenyl groups are irregularly distributed along the polymer chain and are concentrated at the chain end.

b. The living polymer solution is directly mixed with another 50 ml of 1.5% lithium butyl solution, and as a result the red color strongly increases in intensity.

c. The solution is then cooled to about −30°C and 250 g of methyl methacrylate (distilled over CaH$_2$) are added with rapid stirring. The graft copolymerization of the methyl methacrylate proceeds to 100% conversion with a strong heat effect. The molecular weight of the product is about 200,000 as determined by viscosity measurements. The graft copolymer consists of 45% by weight of butadiene, 50% by weight of methyl methacrylate and 5% by weight of diisopropenylbenzene. The butadiene units are mainly attached in the 1,2-positions and the copolymer still contains free isopropenyl groups. These groupings are highly reactive for free-radical grafting.

EXAMPLE 4 a. 2,000 ml of toluene are placed in a vessel and 300 g of styrene together with 50 g of p-diisopropenylbenzene are added. Polymerization is commenced at 30°C by the addition of 30 ml of a 1.5% solution of lithium butyl in hexane. Polymerization is complete after 1 hour. Conversion is 97%. The diisopropenylbenzene is randomly distributed in the polymer chain and the polymer is completely soluble. Its molecular weight is about 85,000. According to infrared measurements it contains about 5.5% of isopropenyl double bonds.

b$_1$. Half of the polymer solution is mixed with slightly impure toluene to stop the chains. 60 ml of lithium butyl (1.5% solution in anisol) are then added and the mixture is heated to 50°C. The solution turns red. It is stirred for 1 hour at 50°C.

c$_1$. The solution is mixed with 200 g of butadiene and heated to 50°c. Polymerization is complete after 2 hours. The product is a graft copolymer of polystyrene with polybutadiene side chains. Conversion is 100%. The product is composed of 39% by weight of styrene, 55% by weight of butadiene and 6% by weight of diisopropenylbenzene. The butadiene has been incorporated to an extent of 15% in the 1,2-vinyl positions, 55% in the trans-1,4-positions and 30% in the cis-1,4-positions. The molecular weight is 200,000.

b$_2$. The other half of the polymer solution is precipitated and the polymer thus obtained is vacuum dried and dissolved in 1,000 ml of tetrahydrofuran, and this solution is mixed with 20 ml of a 0.5M solution of potassium naphthalene in tetrahydrofuran at room temperature. The color immediately changes from dark green to red.

c$_2$. To the living polymer solution having potassium as gegenion there are added 200 g of ehtylene oxide (distilled over lithium butyl), and the solution is heated to 40°C. A conversion of 100% is obtained after 4 hours. The product is a graft copolymer of polystyrene and polyethylene oxide. It is composed of 39% by weight of styrene, 55% by weight of ethylene oxide and 6% by weight of diisopropenylbenzene units. The molecular weight is approx. 150,000.

We claim:

1. Modified copolymers of from 99 to 50% by weight of a vinyl aromatic compound or diene hydrocarbon and from 1 to 50% by weight of diisopropenylbenzene and having a content of at least 0.2% by weight of a group of the general formula:

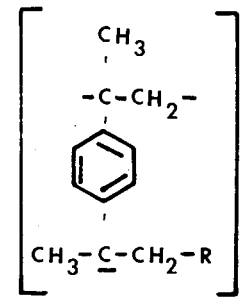

in which R is alkyl, aryl or cycloalkyl of up to 36 carbon atoms, said copolymers having been modified by reaction with organo-alkali metal compounds.

2. Modified copolymers as claimed in claim 1 which are copolymers of styrene and p-diisopropenylbenzene.

3. Modified copolymers as claimed in claim 1 which are copolymers of butadiene and p-diisopropenylbenzene.

4. Modified copolymers as claimed in claim 1, in which R in the general formula is n-butyl.

5. A process for the manufacture of modified copolymers as claimed in claim 1, wherein
   a. vinyl aromatics or diene hydrocarbons are copolymerized with from 1 to 50% by weight of diisopropenylbenzene in organic solvents with the aid of organometallic initiators and
   b. the resulting copolymer is metallized with organometallic compounds in organic solvents.

6. A process for the manufacture of modified copolymers as claimed in claim 5, wherein styrene and p-diisopropenylbenzene are copolymerized.

7. A process for the manufacture of modified copolymers as claimed in claim 5, wherein butadiene and p-diisopropenylbenzene are copolymerized.

8. A process for the manufacture of modified copolymers as claimed in claim 5, wherein metallization is carried out with n-butyl lithium as the organo-alkali metal compound.

* * * * *

UNITED STATES PATENT AND TRADEMARK OFFICE
CERTIFICATE OF CORRECTION

PATENT NO. : 3,933,774
DATED : January 20, 1976
INVENTOR(S) : Franz Neumayr et al It is certified that error appears in the above-identified patent and that said Letters Patent are hereby corrected as shown below:

In the Abstract, the fourth line, after "of the general formula" insert

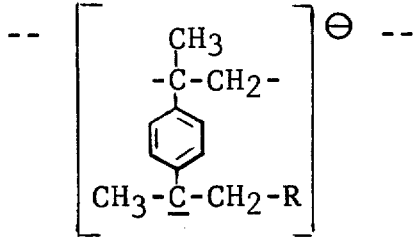

In Column 1, Line 47, delete "... or idene hydrocarbons..." and substitute --... or diene hydrocarbons...--

In Column 2, Line 11, delete "... the diisopropylbenzene..." and substitute --... the diisopropenylbenzene...--

In Column 3, Line 53, delete "... wiehgt of methyl..." and substitute --...weight of methyl...--

In Column 5, Line 49, delete "...of ehtylene oxide..." and substitute --...of ethylene oxide...--

In Column 6, Claim 1, insert -- ⊖ -- outside of the right hand bracket of the general formula.

Signed and Sealed this

Twenty-eighth Day of September 1976

[SEAL]

Attest:

RUTH C. MASON
Attesting Officer

C. MARSHALL DANN
Commissioner of Patents and Trademarks